United States Patent
Takata

(10) Patent No.: US 12,158,099 B2
(45) Date of Patent: Dec. 3, 2024

(54) TURBINE AND TURBOCHARGER

(71) Applicant: MITSUBISHI HEAVY INDUSTRIES ENGINE & TURBOCHARGER, LTD., Sagamihara (JP)

(72) Inventor: Ryo Takata, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 24 days.

(21) Appl. No.: 18/016,539

(22) PCT Filed: Aug. 4, 2020

(86) PCT No.: PCT/JP2020/029801
§ 371 (c)(1),
(2) Date: Jan. 17, 2023

(87) PCT Pub. No.: WO2022/029876
PCT Pub. Date: Feb. 10, 2022

(65) Prior Publication Data
US 2023/0272738 A1     Aug. 31, 2023

(51) Int. Cl.
*F02B 37/18*     (2006.01)
*F04D 17/10*     (2006.01)
*F04D 27/02*     (2006.01)

(52) U.S. Cl.
CPC ............ *F02B 37/183* (2013.01); *F04D 17/10* (2013.01); *F04D 27/0215* (2013.01)

(58) Field of Classification Search
CPC ..... F02B 37/183; F04D 17/10; F04D 27/0215
See application file for complete search history.

(56) References Cited

U.S. PATENT DOCUMENTS

| 5,857,337 A | 1/1999 | Kawasaki |
| 6,073,447 A | 6/2000 | Kawakami et al. |

(Continued)

FOREIGN PATENT DOCUMENTS

| JP | 54-19007 A | 2/1979 |
| JP | 62-29723 A | 2/1987 |

(Continued)

OTHER PUBLICATIONS

International Preliminary Report on Patentability and English translation of the Written Opinion of the International Searching Authority for International Application No. PCT/JP2020/029801, dated Feb. 16, 2023.

(Continued)

*Primary Examiner* — Sang K Kim
(74) *Attorney, Agent, or Firm* — Birch, Stewart, Kolasch & Birch, LLP

(57) ABSTRACT

A turbine according to at least one embodiment is provided with: a turbine wheel having a plurality of blades; a turbine housing internally forming a turbine wheel accommodating space for accommodating the turbine wheel; and a wastegate valve for controlling the flow rate of exhaust gas flowing through a wastegate passage formed inside the turbine housing. The wastegate passage is configured to connect a scroll passage formed inside the turbine housing and a region upstream of a trailing edge of each of the plurality of blades in the turbine wheel accommodating space.

12 Claims, 18 Drawing Sheets

(56) References Cited

U.S. PATENT DOCUMENTS

| | | | |
|---|---|---|---|
| 8,191,368 B2 * | 6/2012 | Garrett | F01D 17/167 415/157 |
| 9,103,235 B2 * | 8/2015 | Yamanaka | F02B 37/183 |
| 11,578,624 B2 * | 2/2023 | Copeland | F01D 5/048 |
| 2012/0060494 A1 * | 3/2012 | Sato | F02B 37/183 60/602 |
| 2015/0040561 A1 | 2/2015 | Matsui | |
| 2020/0263568 A1 | 8/2020 | Copeland et al. | |

FOREIGN PATENT DOCUMENTS

| | | |
|---|---|---|
| JP | 10-8977 A | 1/1998 |
| JP | 3624521 B2 | 3/2005 |
| JP | 2005-509791 A | 4/2005 |
| JP | 2007-192172 A | 8/2007 |
| JP | 2008-75649 A | 4/2008 |
| JP | 4548237 B2 | 9/2010 |
| JP | 2012-211572 A | 11/2012 |
| JP | 5858143 B2 | 2/2016 |
| JP | 2018-127989 A | 8/2018 |
| JP | 6620654 B2 | 12/2019 |
| JP | 2020-517861 A | 6/2020 |
| WO | WO03/044327 A1 | 5/2003 |
| WO | WO2019/123567 A1 | 6/2019 |

OTHER PUBLICATIONS

International Search Report for International Application No. PCT/JP2020/029801, dated Sep. 15, 2020.

* cited by examiner

VIEW V-V

VIEW V-V

VIEW V-V

VIEW V-V

VIEW V-V

TURBINE AND TURBOCHARGER

TECHNICAL FIELD

The present disclosure relates to a turbine and a turbocharger.

BACKGROUND

A turbocharger is often provided with a wastegate valve to suppress an excessive increase in boost pressure. The wastegate valve adjusts the amount of exhaust gas flowing into a turbine of the turbocharger by opening and closing a wastegate passage which is a bypass passage to bypass the turbine (see Patent Document 1, for example).

CITATION LIST

Patent Literature

Patent Document 1: JP2018-127989A

SUMMARY

Problems to be Solved

The wastegate passage described in Patent Document 1 is configured to flow exhaust gas to the downstream side of the turbine so as to bypass blades of the turbine wheel. Therefore, when flowing exhaust gas through the wastegate passage to cause the exhaust gas exceeding the turbine intake flow amount to bypass the blades, the exhaust gas flowing through the wastegate passage cannot contribute to the improvement of the output of the turbine.

In view of the above, an object of at least one embodiment of the present disclosure is to improve the output of the turbine when exhaust gas is bypassed to the wastegate passage.

Solution to the Problems (1) A turbine according to at least one embodiment of the present disclosure is provided with: a turbine wheel having a plurality of blades; a turbine housing internally forming a turbine wheel accommodating space for accommodating the turbine wheel; and a wastegate valve for controlling a flow rate of exhaust gas flowing through a wastegate passage formed inside the turbine housing. The wastegate passage is configured to connect a scroll passage formed inside the turbine housing and a region upstream of a trailing edge of each of the plurality of blades in the turbine wheel accommodating space.

(2) A turbocharger according to at least one embodiment of the present disclosure is provided with the turbine according to the above configuration (1).

Advantageous Effects

According to at least one embodiment of the present disclosure, it is possible to improve the output of the turbine when exhaust gas is bypassed to the wastegate passage.

DETAILED DESCRIPTION

Embodiments of the present disclosure will be described below with reference to the accompanying drawings. It is intended, however, that unless particularly identified, dimensions, materials, shapes, relative positions, and the like of components described in the embodiments shall be interpreted as illustrative only and not intended to limit the scope of the present disclosure.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

(Overall Configuration of Turbocharger 1)

Figure 1:
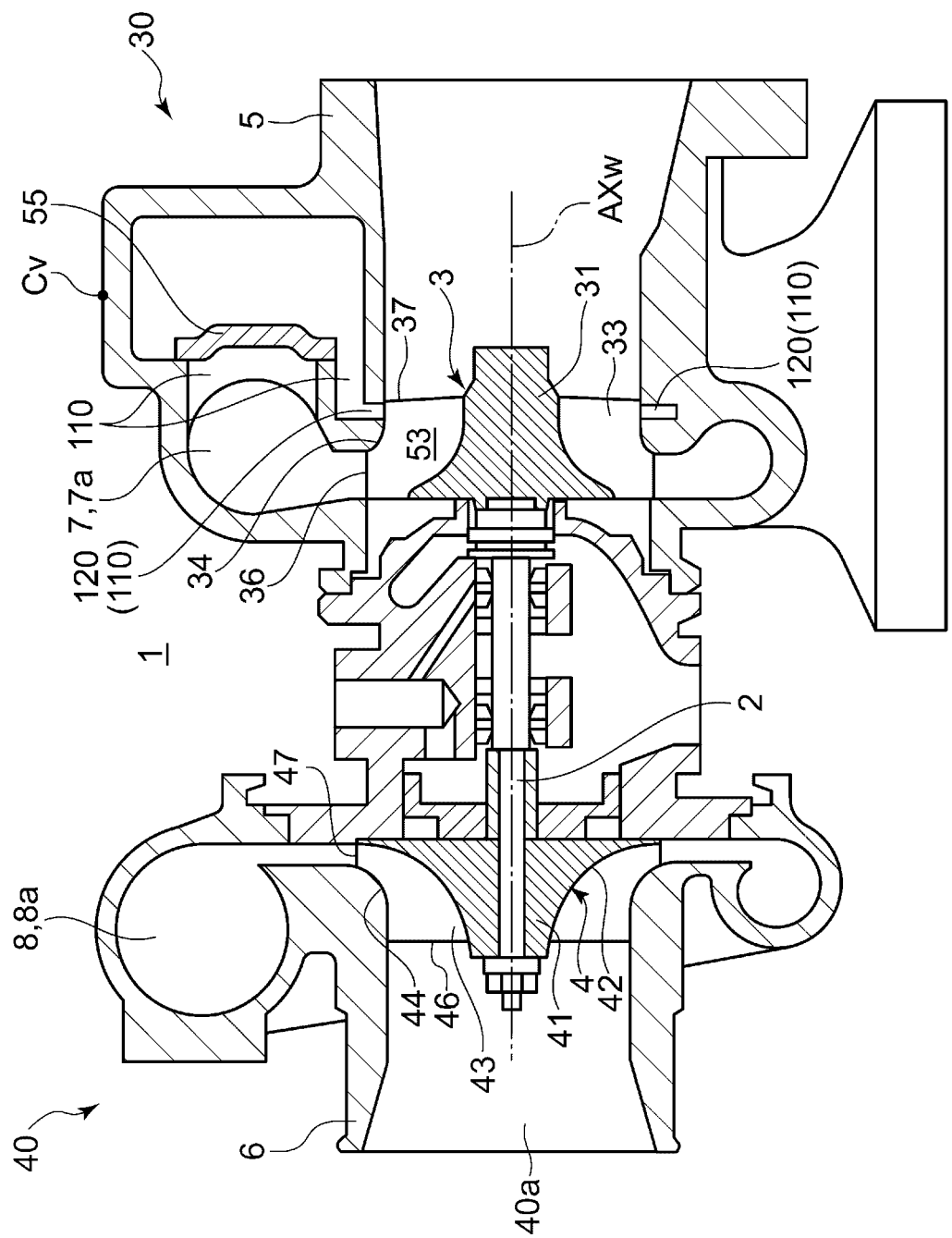
FIG. 1 is a cross-sectional view showing an example of a turbocharger according to some embodiments.

FIG. 1 is a cross-sectional view showing an example of a turbocharger 1 according to some embodiments.

The turbocharger 1 according to some embodiments is an exhaust turbocharger for supercharging air to an engine mounted on a vehicle such as an automobile.

The turbocharger 1 includes a turbine wheel 3 and a compressor wheel 4 coupled to each other with a rotor shaft 2 as a rotational shaft, a casing (turbine housing) 5 for accommodating the turbine wheel 3 rotatably, and a casing (compressor housing) 6 for accommodating the compressor wheel 4 rotatably. The turbine housing 5 includes a scroll portion 7 internally having a scroll passage 7a. The compressor housing 6 includes a scroll portion 8 internally having a scroll passage 8a.

A turbine 30 according to some embodiments is provided with the turbine wheel 3 and the casing 5. A compressor 40 according to some embodiments is provided with the compressor wheel 4 and the casing 6.

(Turbine Wheel 3)

Figure 2:
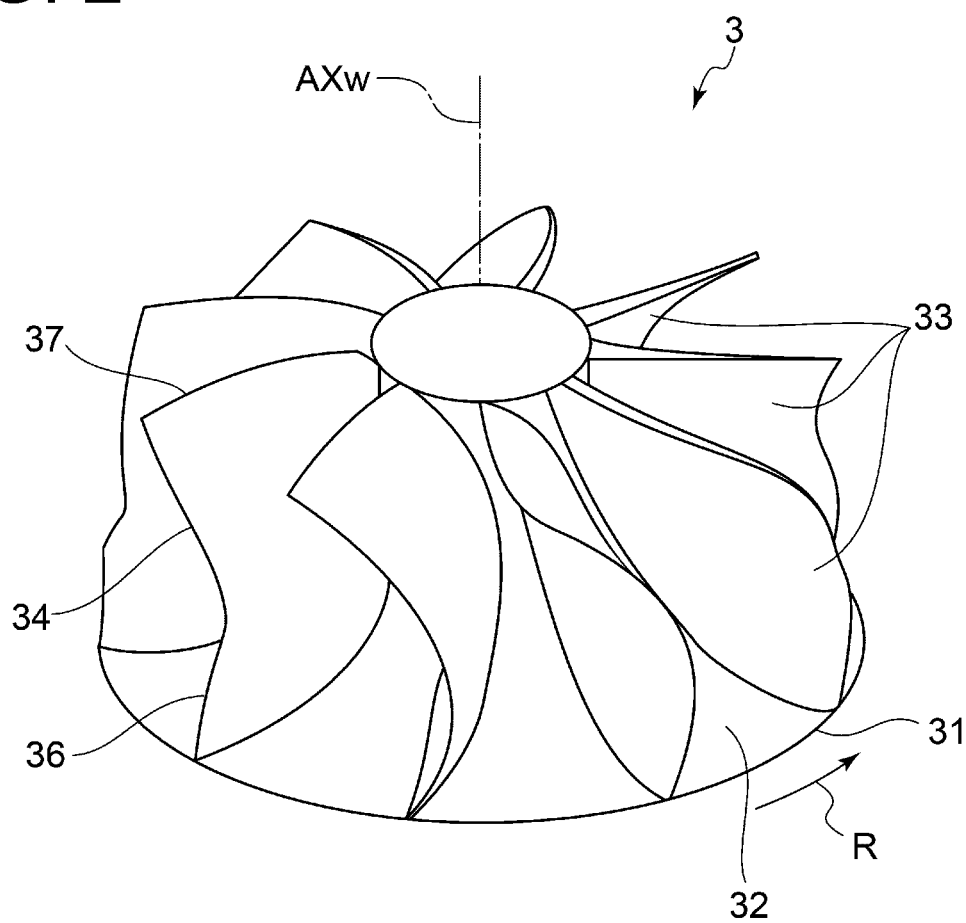
FIG. 2 is a perspective view showing the appearance of a turbine wheel according to some embodiments.

FIG. 2 is a perspective view showing the appearance of the turbine wheel 3 according to some embodiments.

Figure 3:
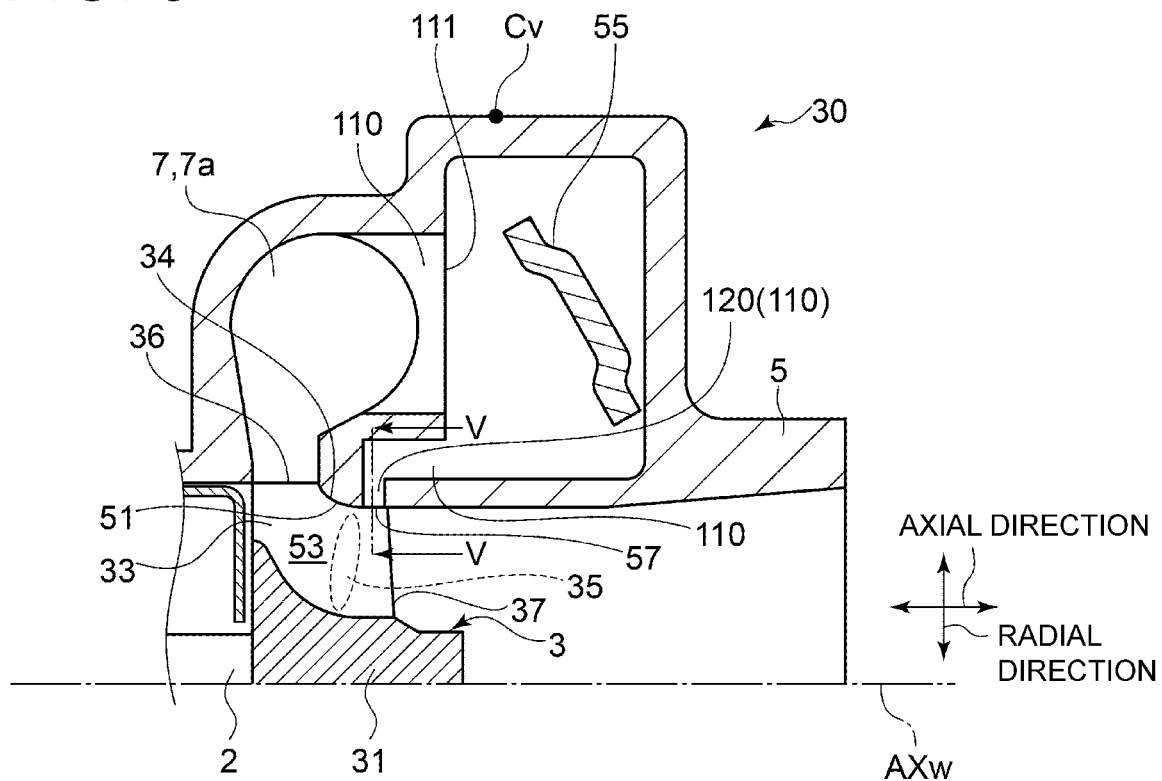
FIG. 3 is a view schematically showing a cross-section of a part of a turbine according to some embodiments.

FIG. 3 is a view schematically showing a cross-section of a part of the turbine 30 according to some embodiments.

The turbine wheel 3 according to some embodiments is an impeller coupled to the rotor shaft (rotational shaft) 2 and rotated about a rotational axis AXw. The turbine wheel 3 according to some embodiments includes a hub 31 having a hub surface 32 oblique to the rotational axis AXw and a plurality of blades (rotor blades) 33 disposed on the hub surface 32, in a cross-section along the rotational axis AXw. The turbine wheel 3 shown in FIGS. 1 and 2 is a radial turbine, but may be a mixed flow turbine. In FIG. 2, the arrow R indicates a rotational direction of the turbine wheel 3. The blades 33 are arranged at intervals in the circumferential direction of the turbine wheel 3.

The turbine wheel 3 according to some embodiments has a throat portion 35 where the area of flow passage formed between two circumferentially adjacent blades 33 is the smallest (see FIG. 3). In the turbine wheel 3 according to some embodiments, the throat portion 35 is formed, on the pressure side of each blade 33, in a region closer to the leading edge 36 than the trailing edge 37 of the blade.

Although illustration by the perspective view is omitted, the compressor wheel 4 according to some embodiments also have the same configuration as the turbine wheel 3 according to some embodiments. That is, the compressor wheel 4 according to some embodiments is an impeller coupled to the rotor shaft (rotational shaft) 2 and rotated about the rotational axis AXw. The compressor wheel 4 according to some embodiments includes a hub 41 having a hub surface 42 oblique to the rotational axis AXw and a plurality of blades (rotor blades) 43 disposed on the hub surface 42, in a cross-section along the rotational axis AXw. The blades 43 are arranged at intervals in the circumferential direction of the compressor wheel 4.

In the following description, the extension direction of the rotational axis AXw is simply referred to as the axial direction, the radial direction with respect to the rotational axis AXw is simply referred to as the radial direction, and the circumferential direction with respect to the rotational axis AXw is simply referred to as the circumferential direction.

In the turbocharger 1 thus configured, exhaust gas serving as a working fluid of the turbine 30 flows from the leading edge 36 toward the trailing edge 37 of the turbine wheel 3. This rotates the turbine wheel 3, and in turn rotates the compressor wheel 4 of the compressor coupled to the turbine wheel 3 via the rotor shaft 2. As a result, intake air from an inlet portion 40a of the compressor 40 is compressed by the compressor wheel 4 in the process of flowing from the leading edge 46 to the trailing edge 47 of the compressor wheel 4.

(Overview of Wastegate Passage 110)

As described above, the turbine 30 according to some embodiments includes the turbine wheel 3, and the turbine housing 5 internally forming a turbine wheel accommodating space 53 for accommodating the turbine wheel 3. The turbine 30 according to some embodiments includes a wastegate valve 55 for controlling the flow rate of exhaust gas flowing through a wastegate passage 110 formed inside the turbine housing 5. In some embodiments, for example, as shown in FIG. 3 and FIGS. 4, 6, 7, and 8A to 8C described later, the wastegate valve 55 may comprise a swing valve whose radially outer position is pivotably supported by the turbine housing 5. Further, for example, as shown in FIGS. 9A to 9C described later, the wastegate valve 55A may be configured to be movable in the axial direction without changing the posture relative to the turbine housing 5, instead of being pivotable.

FIG. 1 shows a state where the wastegate valve 55 closes an opening 111 of the wastegate passage 110 opened and closed by the wastegate valve 55. Further, FIG. 3 shows a state where the opening 111 is open.

For example, although FIGS. 1, 3, and figures described later show the position of the swing center Cv of the wastegate valve 55, the position of the swing center Cv is not limited to the positions shown in the figures.

In the turbine 30 according to some embodiments, as shown in FIGS. 1, 3, and figures described later, the wastegate passage 110 is configured to connect the scroll passage 7a formed inside the turbine housing 5 and a region upstream of the trailing edge 37 of each of the plurality of blades 33 in the turbine wheel accommodating space 53. More specifically, the wastegate passage 110 according to some embodiments includes a communication portion 120 having at the downstream end an opening portion 57 formed on an inner surface 51 of the casing 5 that faces the tip portions (tips) of the blades 33. In some embodiments, the wastegate passage 110 is communicated with the turbine wheel accommodating space 53 through the communication portion 120. Details of the communication portion 120 will be described later.

In a typical turbocharger, the wastegate passage of the turbine is configured to flow exhaust gas to the downstream side of the turbine so as to bypass blades of the turbine wheel. Therefore, when flowing exhaust gas through the wastegate passage to cause the exhaust gas exceeding the turbine intake flow to bypass the blades, the exhaust gas flowing through the wastegate passage cannot contribute to the improvement of the output of the turbine.

In contrast, in the turbine 30 according to some embodiments, the wastegate passage 110 is configured such that exhaust gas flowing through the wastegate passage 110 is guided to a region upstream of the trailing edge 37 of each of the blades 33 in the turbine wheel accommodating space 53. Thereby, the exhaust gas in the wastegate passage 110 flows toward the plurality of blades 33 of the turbine wheel 3, so that energy of the exhaust gas can be recovered as kinetic energy of the turbine wheel 3. As a result, power can be recovered from the exhaust gas flowing through the wastegate passage 110, and the output of the turbine 30 can be improved when the exhaust gas is bypassed to the wastegate passage 110.

In a typical turbine of a turbocharger, a gap exists between the tip 34 of the blade 33 and the inner surface 51 of the casing 5. Leakage flow (tip leakage) occurs through this gap, affecting the flow field and performance of the turbo machine.

In a turbine of a turbocharger, the upstream end of the wastegate passage is generally provided on a flow passage radially outward of the turbine wheel 3, such as in the middle of the scroll passage 7a or upstream of the scroll passage 7a. Therefore, in the turbine 30 according to some embodiments, in order to connect the wastegate passage 110 to the turbine wheel accommodating space 53, the downstream end of the wastegate passage 110, i.e., the downstream end of the communication portion 120 according to some embodiments, is provided on the inner surface 51 of the casing 5 that faces the tips 34 of the blades 33. Therefore, with the turbine 30 according to some embodiments, since the exhaust gas having passed through the wastegate passage 110 flows from the inner surface 51 of the casing 5 toward the tip 34 when guided into the turbine wheel accommodating space 53, the flow of tip leakage is blocked, and the tip leakage is suppressed. Thereby, the efficiency of the turbine 30 can be improved, and thus the output of the turbine 30 can be improved.

With the turbocharger 1 according to some embodiments, since the turbocharger 1 according to some embodiments is provided with the turbine 30 according to some embodiments, it is possible to improve the partial load performance of the turbine 30.

In the turbine 30 according to some embodiments, for example, as shown in FIG. 3, the wastegate passage 110 may be configured to connect the scroll passage 7a and a region downstream of the throat portion 35 and upstream of the trailing edge 37 of each of the plurality of blades 33 in the turbine wheel accommodating space 53.

Generally, the turbine intake flow amount is determined by the flow passage area of the throat portion. Therefore, if the wastegate passage 110 is connected to a region upstream of the throat portion 35, the intake flow amount of the turbine 30 may be reduced due to exhaust gas that flows into the region upstream of the throat portion 35 via the wastegate passage 110.

Therefore, by connecting the wastegate passage 110 to a region downstream of the throat portion 35 as in the turbine 30 according to some embodiments, even if the exhaust gas having flowed through the wastegate passage 110 flows into the turbine wheel accommodating space 53, the influence on the intake flow amount of the turbine 30 can be suppressed. Further, by connecting the wastegate passage 110 to a region downstream of the throat portion 35, compared to the case where the wastegate passage 110 is connected to a region upstream of the throat portion 35, the exhaust gas can be efficiently discharged to the downstream side of the turbine 30 via the wastegate passage 110.

(Case where Turbine Wheel 3 has Splitter Blades 133)

Figure 4:
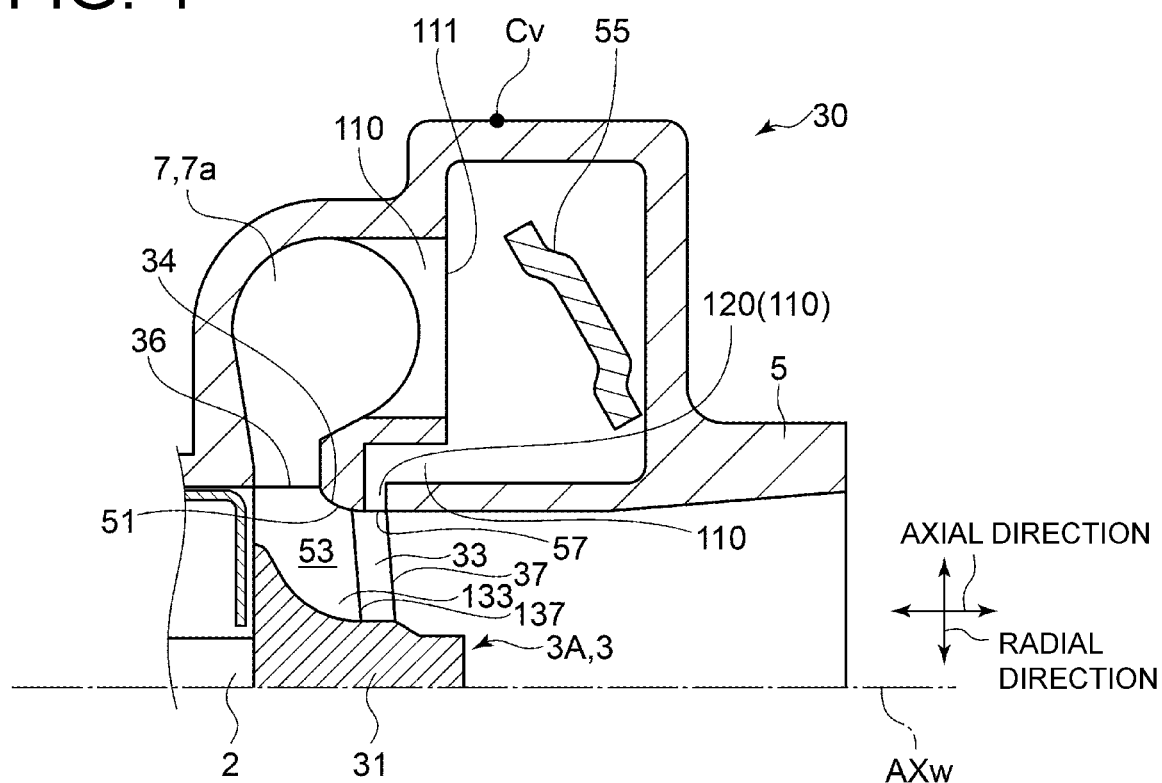
FIG. 4 is a view schematically showing a cross-section of a part of a turbine according to another embodiment.

FIG. 4 is a view schematically showing a cross-section of a part of the turbine 30 according to another embodiment.

In the turbine 30 according to some embodiments, for example, as shown in FIG. 4, the turbine wheel 3 may further include a plurality of splitter blades 133 arranged between the plurality of blades 33 and formed such that the trailing edge 137 of each of the plurality of splitter blades 133 is located on the leading edge 36 side compared to the trailing edge 37 of each of the plurality of blades 33. Additionally, in the turbine 30 according to some embodiments, the wastegate passage 110 may be configured to connect the scroll passage 7a and a region downstream of the trailing edge 137 of each of the splitter blades 133 and upstream of the trailing edge 37 of each of the plurality of blades 33 in the turbine wheel accommodating space 53.

If the throat portion 35 exists within the existence region of the splitter blade 133 in the flow passage formed between two circumferentially adjacent blades 33, by connecting the wastegate passage 110 to a region upstream of the trailing edges 37 of the blades 33 and downstream of the trailing edges 137 of the splitter blades 133 in the turbine wheel accommodating space 53, the wastegate passage 110 is connected to a region downstream of the throat portion 35. As a result, even if the exhaust gas having flowed through the wastegate passage 110 flows into the turbine wheel accommodating space 53, the influence on the intake flow amount of the turbine 30 can be suppressed. Further, by connecting the wastegate passage 110 to a region downstream of the trailing edge 137 of the splitter blade 133, compared to the case where the wastegate passage 110 is connected to a region upstream of the trailing edge 137 of the splitter blade 133, the exhaust gas can be efficiently discharged to the downstream side of the turbine 30 via the wastegate passage 110. Further, since the turbine wheel 3 has the plurality of splitter blades 133, the performance of the turbine 30 can be improved even when exhaust gas does not flow through the wastegate passage 110.

(Communication Portion 120 According to Some Embodiments)

Figure 5A:
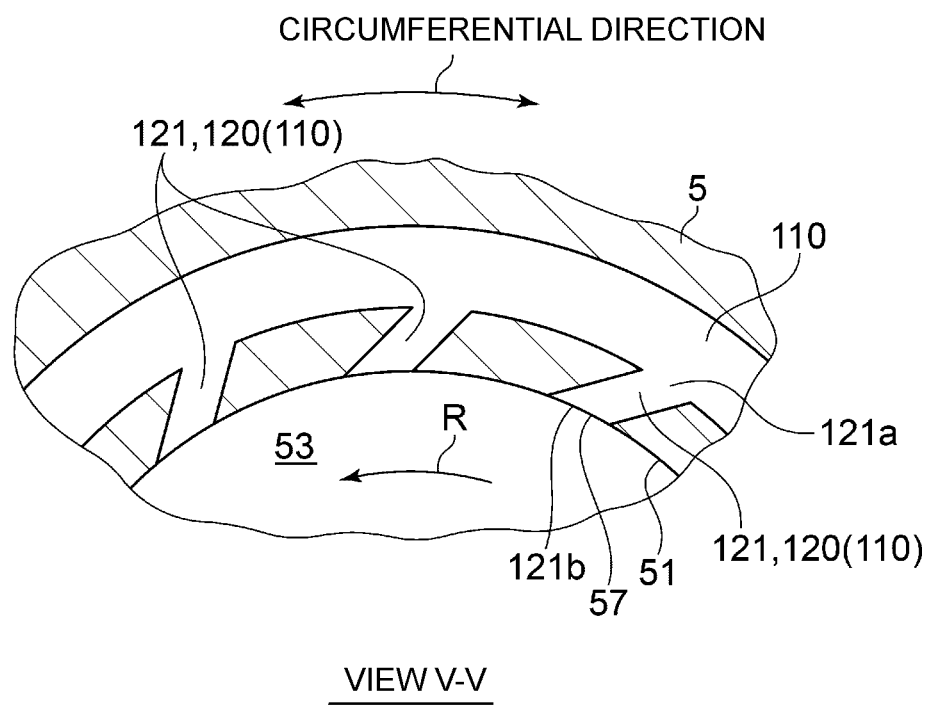
FIG. 5A is an example of a view schematically showing View V-V in FIG. 3.

FIG. 5A is an example of a view schematically showing View V-V in FIG. 3.

Figure 5B:
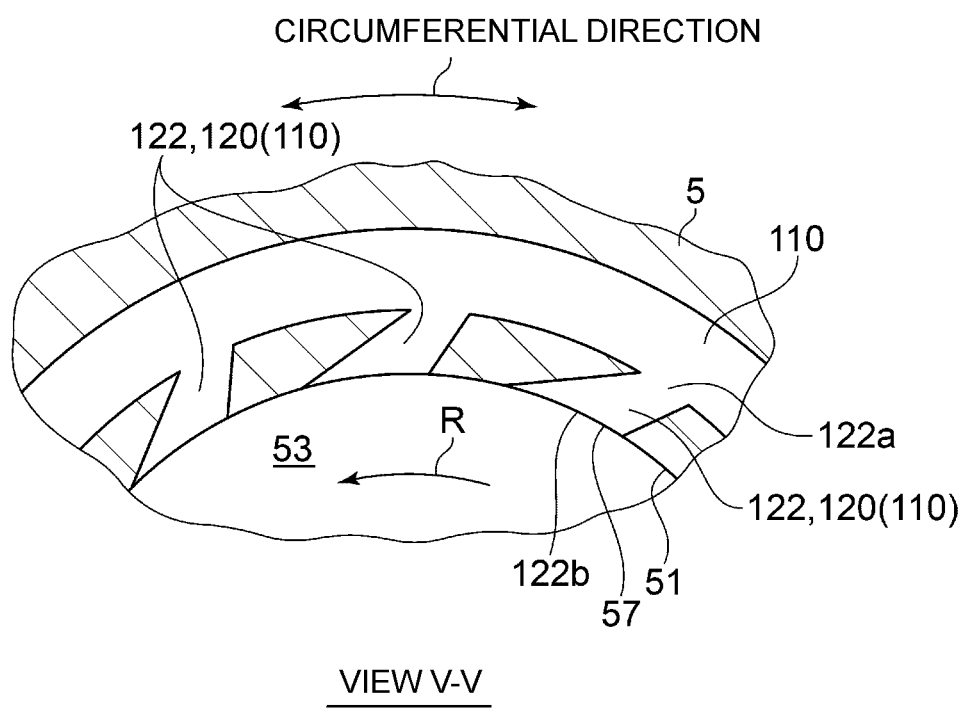
FIG. 5B is another example of a view schematically showing View V-V in FIG. 3.

FIG. 5B is another example of a view schematically showing View V-V in FIG. 3.

Figure 5C:
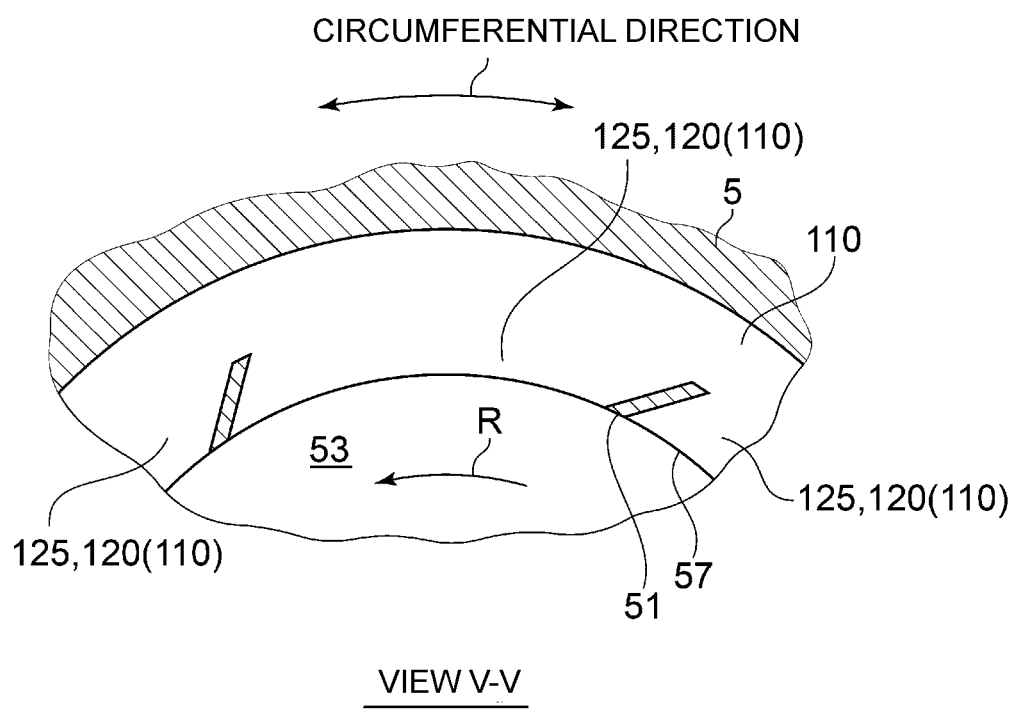
FIG. 5C is another example of a view schematically showing View V-V in FIG. 3.

FIG. 5C is another example of a view schematically showing View V-V in FIG. 3.

Figure 5D:
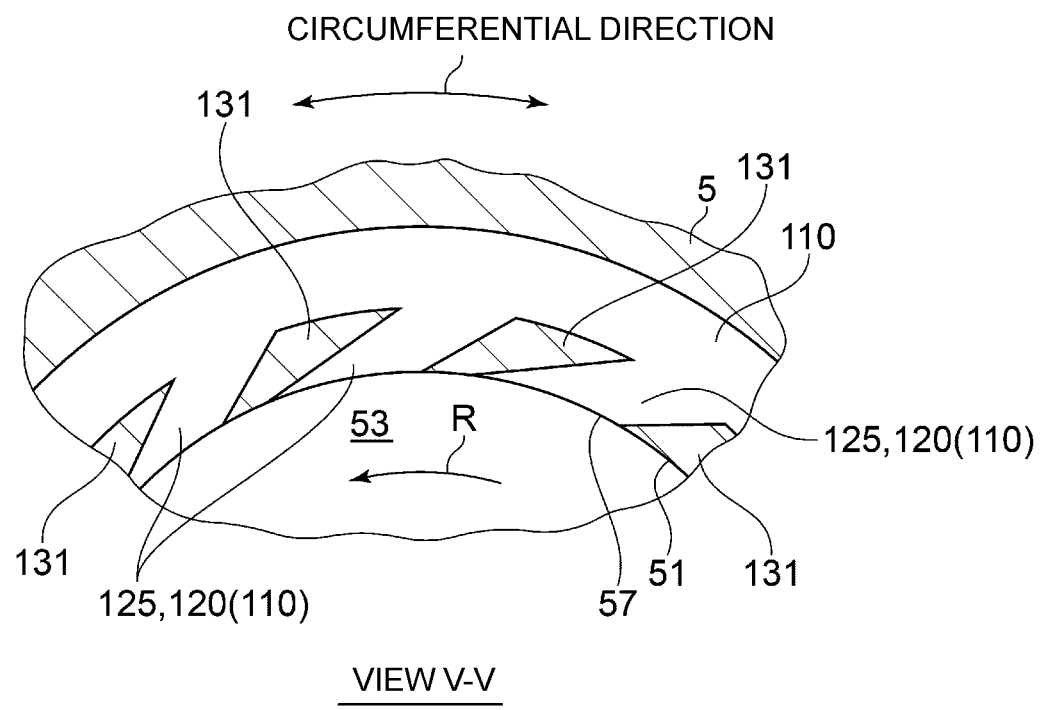
FIG. 5D is another example of a view schematically showing View V-V in FIG. 3.

FIG. 5D is another example of a view schematically showing View V-V in FIG. 3.

Figure 5E:
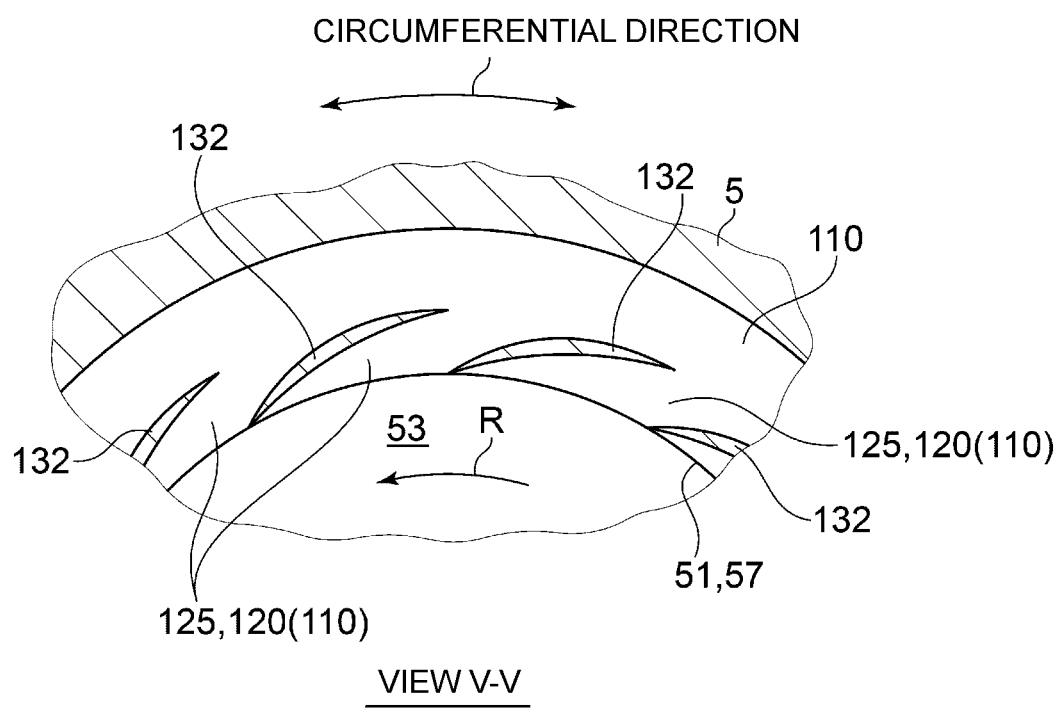
FIG. 5E is another example of a view schematically showing View V-V in FIG. 3.

FIG. 5E is another example of a view schematically showing View V-V in FIG. 3.

Figure 5F:
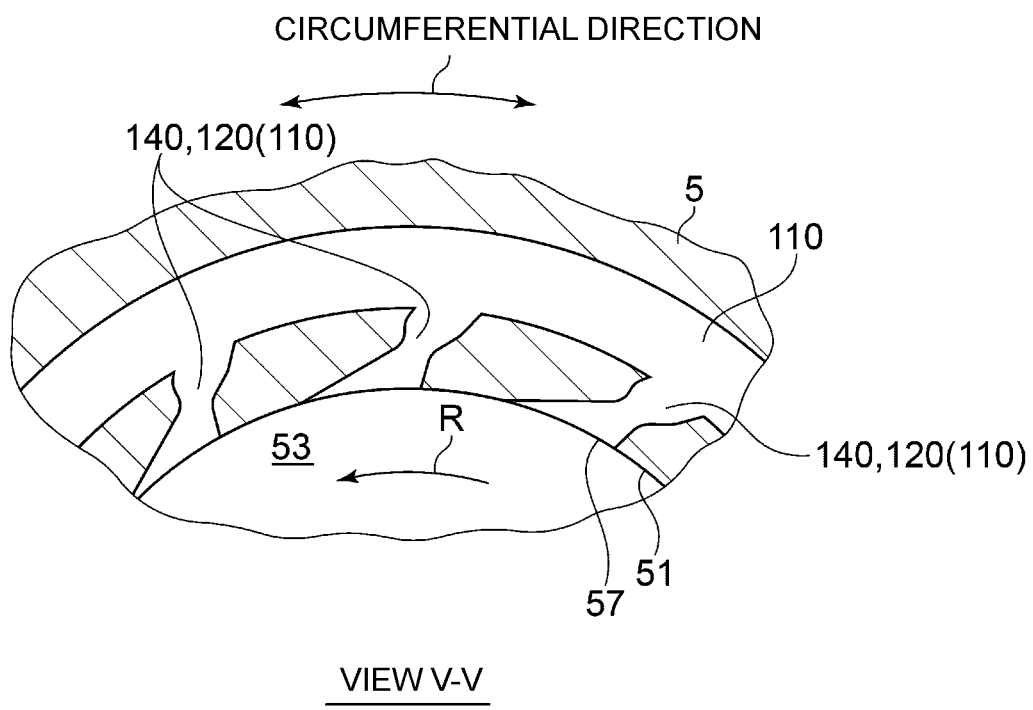
FIG. 5F is another example of a view schematically showing View V-V in FIG. 3.

FIG. 5F is another example of a view schematically showing View V-V in FIG. 3.

In FIGS. 5A to 5F, the turbine wheel 3 is not depicted.

In some embodiments, as shown in FIGS. 5A and 5B, the communication portion 120 may include a plurality of communication holes 121, 122 arranged at intervals in the circumferential direction.

Thereby, the exhaust gas in the wastegate passage 110 can flow through the plurality of communication holes 121, 122 toward the plurality of blades 33 of the turbine wheel 3, ensuring the velocity of exhaust gas blown out of the plurality of communication holes 121, 122.

Each of the plurality of communication holes 121, 122 shown in FIGS. 5A and 5B may be oblique to the radial direction such that the hole extends downstream in the rotational direction R of the turbine wheel 3 toward the radially inner side.

For example, each of the plurality of communication holes 121 shown in FIG. 5A has a constant passage cross-sectional area from an upstream end portion 121a to a downstream end portion 121b.

For example, each of the plurality of communication holes 122 shown in FIG. 5B has a passage cross-sectional area gradually increasing from an upstream end portion 122a to a downstream end portion 122b.

In the plurality of communication holes 121, 122 shown in FIGS. 5A and 5B, the passage cross-sectional shape viewed from the upstream end portion 121a, 122a to the downstream end portion 121b, 122b may be rectangular, circular, or polygonal other than rectangular. Alternatively, the passage cross-sectional shape may be elliptical with the major axis extending along the circumferential direction.

The circumferential arrangement pitch of the plurality of communication holes 121, 122 shown in FIGS. 5A and 5B may be regular or irregular. The circumferential arrangement pitch and the number of the plurality of communication holes 121, 122 shown in FIGS. 5A and 5B may be set so that oscillation of the blades 33 is not induced by exhaust gas blown out of the communication holes 121, 122.

In some embodiments, as shown in FIGS. 5C to 5E, the communication portion 120 may include a groove 125 extending along the circumferential direction.

Thereby, the exhaust gas in the wastegate passage 110 can flow through the groove 125 extending in the circumferential direction toward the plurality of blades 33 of the turbine wheel 3, suppressing oscillation of the blades 33 and improving the reliability of the turbine 30.

The groove 125 according to some embodiments may be divided into multiple grooves along the circumferential direction, for example, as shown in FIG. 5C, or may be a single groove 125 provided continuously over the entire circumference.

In some embodiments, as shown in FIGS. 5D and 5E, the turbine may be provided with a plurality of nozzle members 131, 132 arranged in the groove 125 at intervals in the circumferential direction and configured to guide exhaust gas passing inside the groove 125 so as to flow downstream in the rotational direction R of the turbine wheel 3 as the exhaust gas moves inward in the radial direction.

Thereby, the plurality of nozzle members 131, 132 guides the exhaust gas as described above, so that the exhaust gas can efficiently flow into the turbine wheel accommodating space 53. As a result, it is possible to improve the output of the turbine 30 more greatly when exhaust gas is bypassed to the wastegate passage 110.

For example, each of the plurality of nozzle members 131 shown in FIG. 5D may be a plate-shaped member whose thickness direction is the axial direction (the depth direction on the paper in FIG. 5D). Thereby, the manufacturing cost of the nozzle members 131 can be reduced.

Alternatively, for example, each of the plurality of nozzle members 132 shown in FIG. 5E may be an airfoil-shaped member. Thereby, the exhaust gas can efficiently flow into the turbine wheel accommodating space 53.

In some embodiments, as shown in FIG. 5F, the communication portion 120 may have a convergent-divergent shape. That is, in some embodiments, as shown in FIGS. 5F, the communication portion 120 may have a nozzle portion 140 with a convergent-divergent shape.

Generally, when the wastegate valve 55, 55A is open to allow exhaust gas to flow through the wastegate passage 110, the pressure ratio of the turbine 30 tends to be high. Therefore, the flow velocity of exhaust gas flowing through the communication portion 120 is very high. Therefore, as described above, when the communication portion 120 has a convergent-divergent shape, or de Laval nozzle shape, energy of exhaust gas blown out of the communication portion 120 can be efficiently converted into kinetic energy of the turbine wheel 3. As a result, it is possible to improve the output of the turbine 30 more greatly when exhaust gas is bypassed to the wastegate passage 110. Further, since it is relatively easy to machine the communication portion 120 into a convergent-divergent shape, the manufacturing cost can be reduced.

As shown in FIGS. 5C to 5E, when the communication portion 120 includes the groove 125 extending in the circumferential direction, the width of the groove 125 along the axial direction may be changed with the radial position so that the groove 125 has a convergent-divergent shape when viewed along the circumferential direction.

Figure 6:
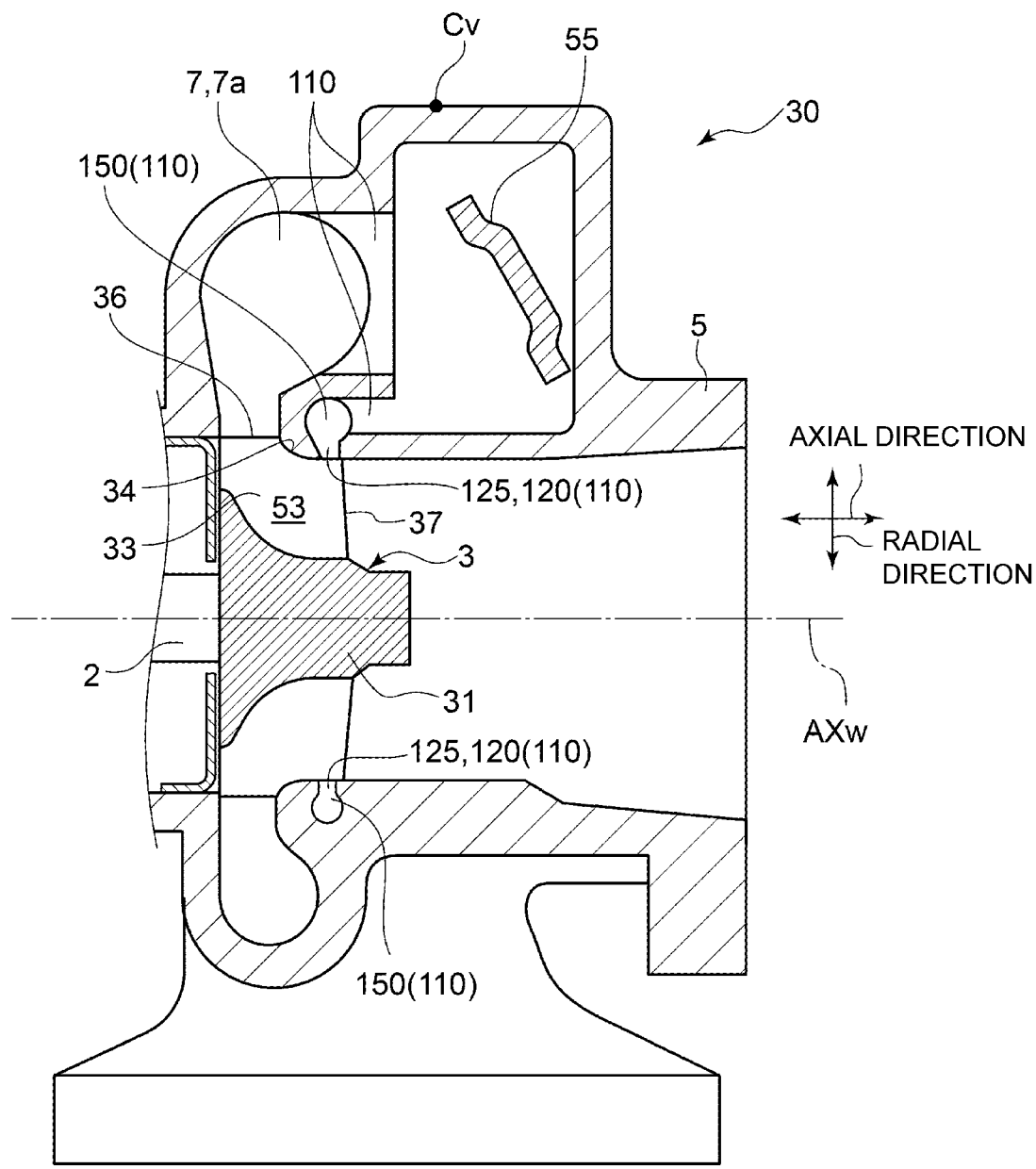
FIG. 6 is a view schematically showing a cross-section of a turbine according to another embodiment.

FIG. 6 is a view schematically showing a cross-section of the turbine 30 according to another embodiment.

In some embodiments, for example, as shown in FIG. 6, the wastegate passage 110 may include a scroll portion 150 configured to have a cross-sectional area that decreases downstream in the rotational direction R of the turbine wheel 3 and communicating with the turbine wheel accommodating space 53 through the groove 125.

Thereby, the scroll portion 150 of the wastegate passage 110 guides the exhaust gas along the circumferential direction, suppressing the difference in flow rate of exhaust gas flowing into the turbine wheel accommodating space 53 through the groove 125 depending on the circumferential position. As a result, it is possible to improve the output of the turbine 30 more greatly when exhaust gas is bypassed to the wastegate passage 110.

(Case with Bypass Portion 160)

Figure 7:
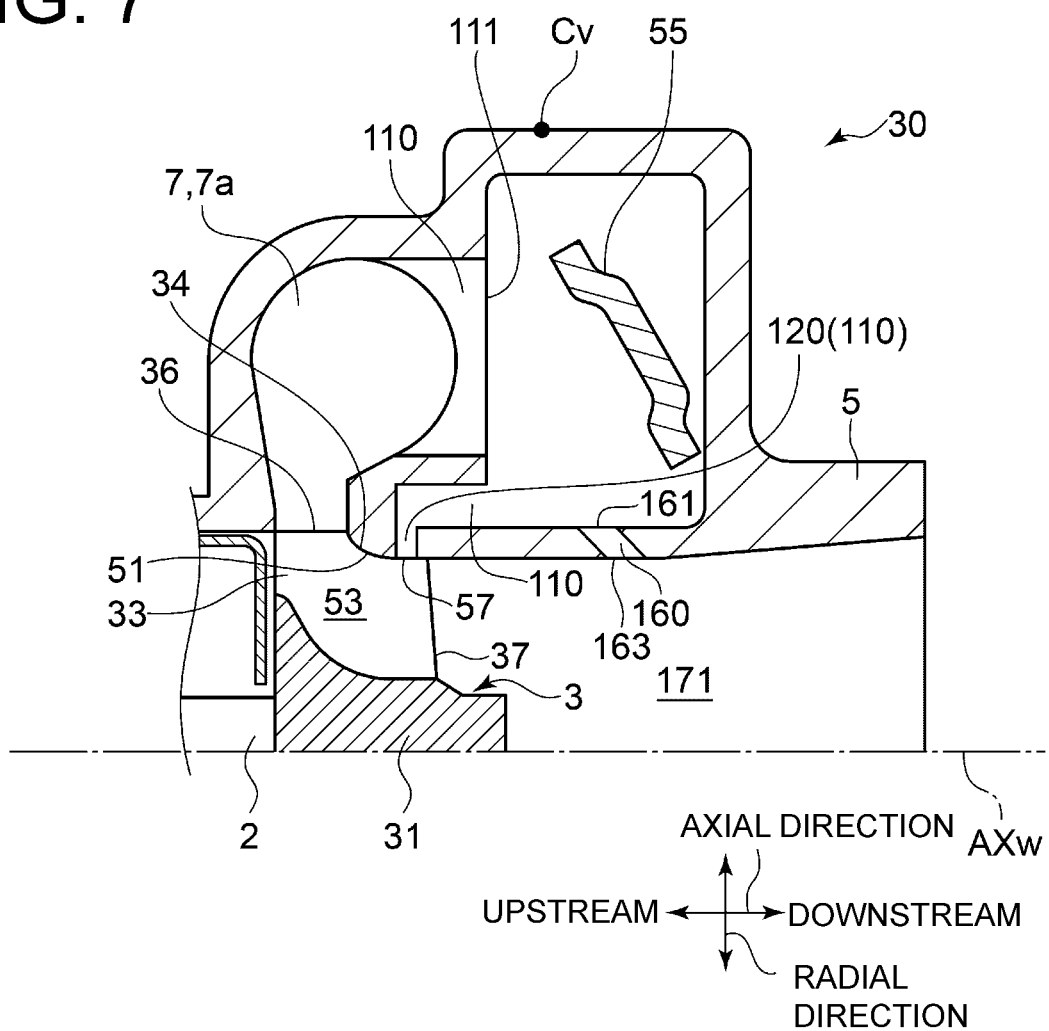
FIG. 7 is a view schematically showing a cross-section of a part of a turbine according to still another embodiment.

FIG. 7 is a view schematically showing a cross-section of a part of the turbine 30 according to still another embodiment. FIG. 7 shows a state where the opening 111 is open.

Figure 8A:
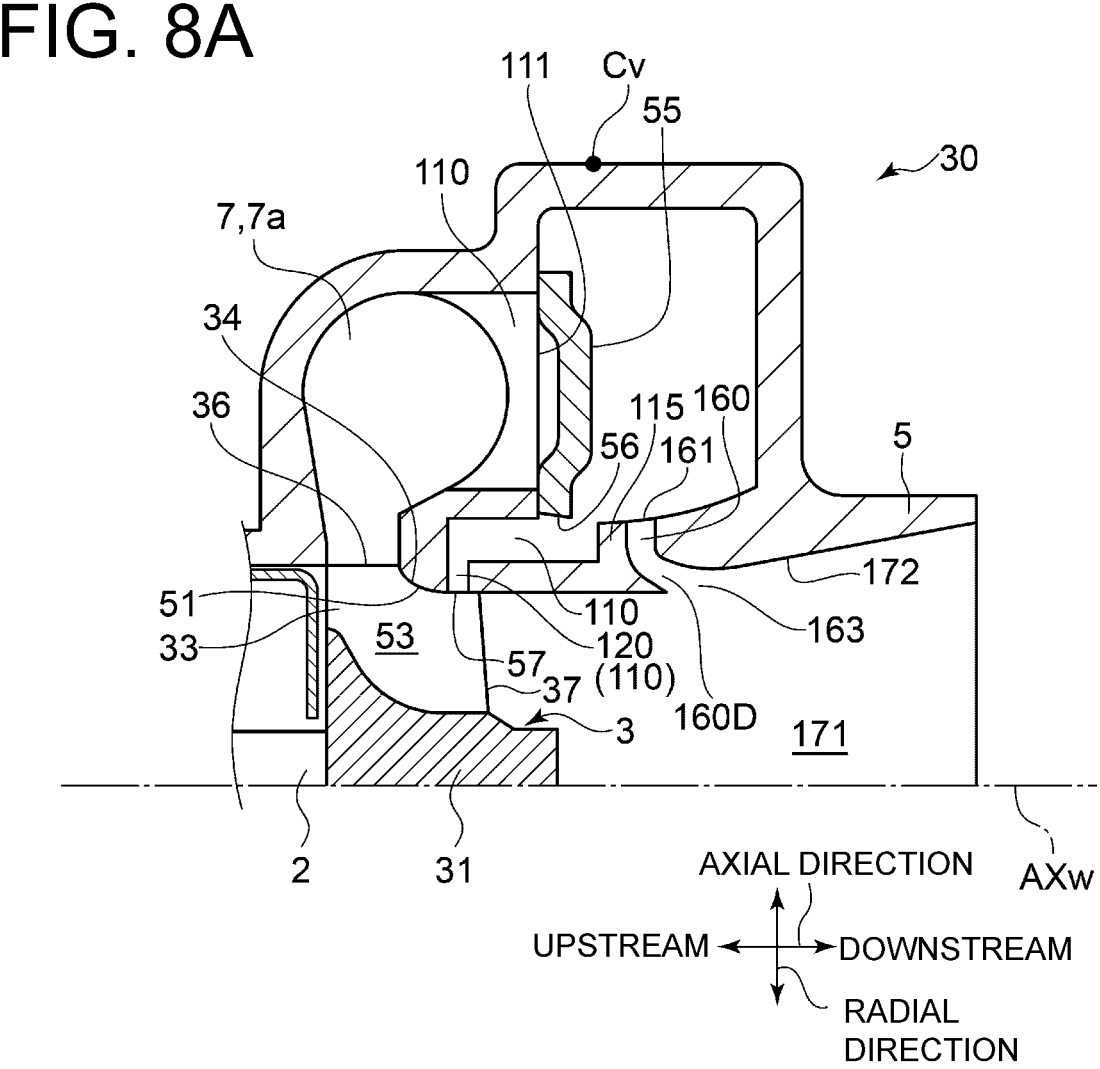
FIG. 8A is a view schematically showing a cross-section of a part of a turbine according to still another embodiment.
Figure 8B:
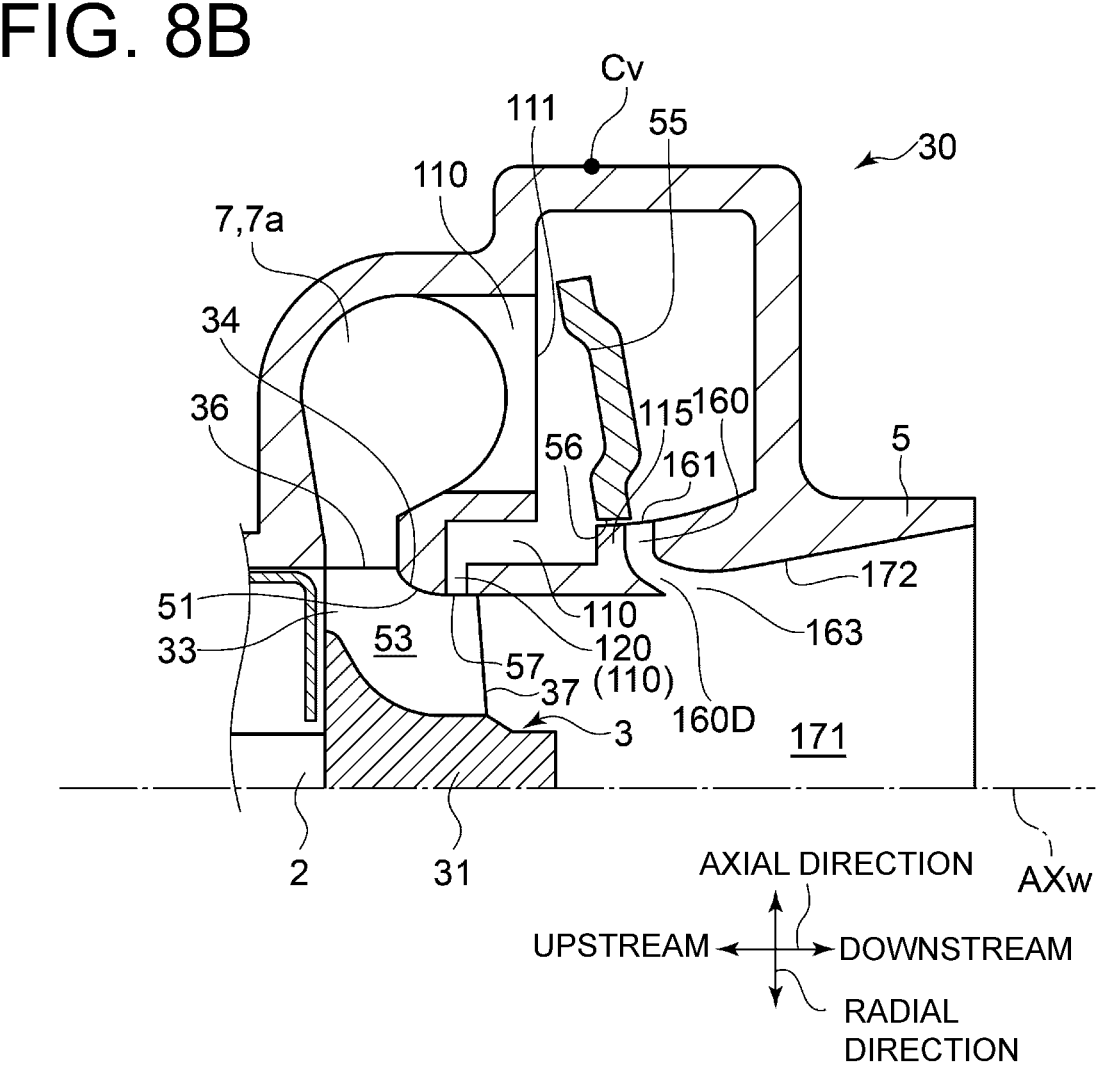
FIG. 8B is a view schematically showing a cross-section of a part of a turbine according to still another embodiment.
Figure 8C:
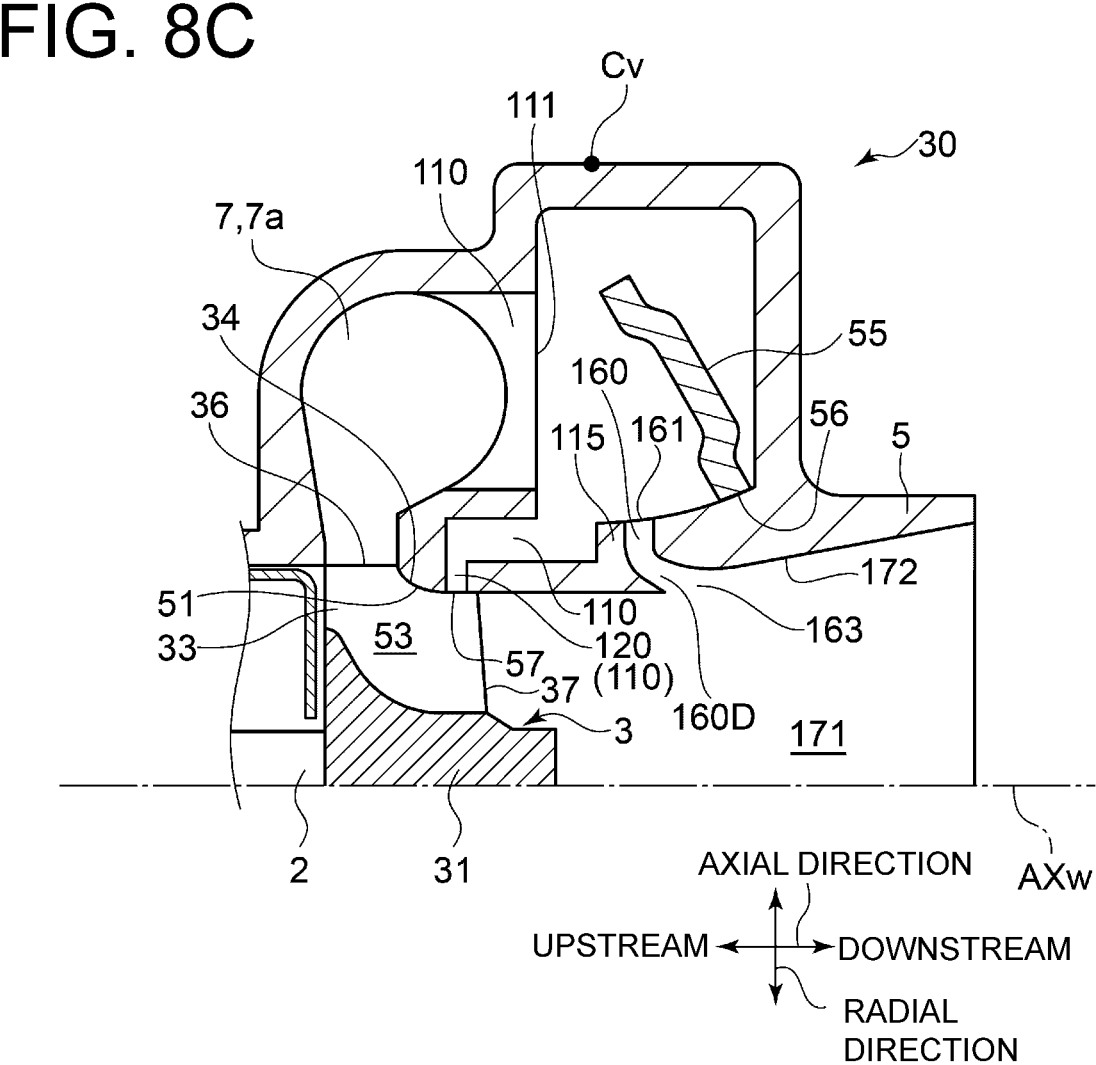
FIG. 8C is a view schematically showing a cross-section of a part of a turbine according to still another embodiment.
Figure 9A:
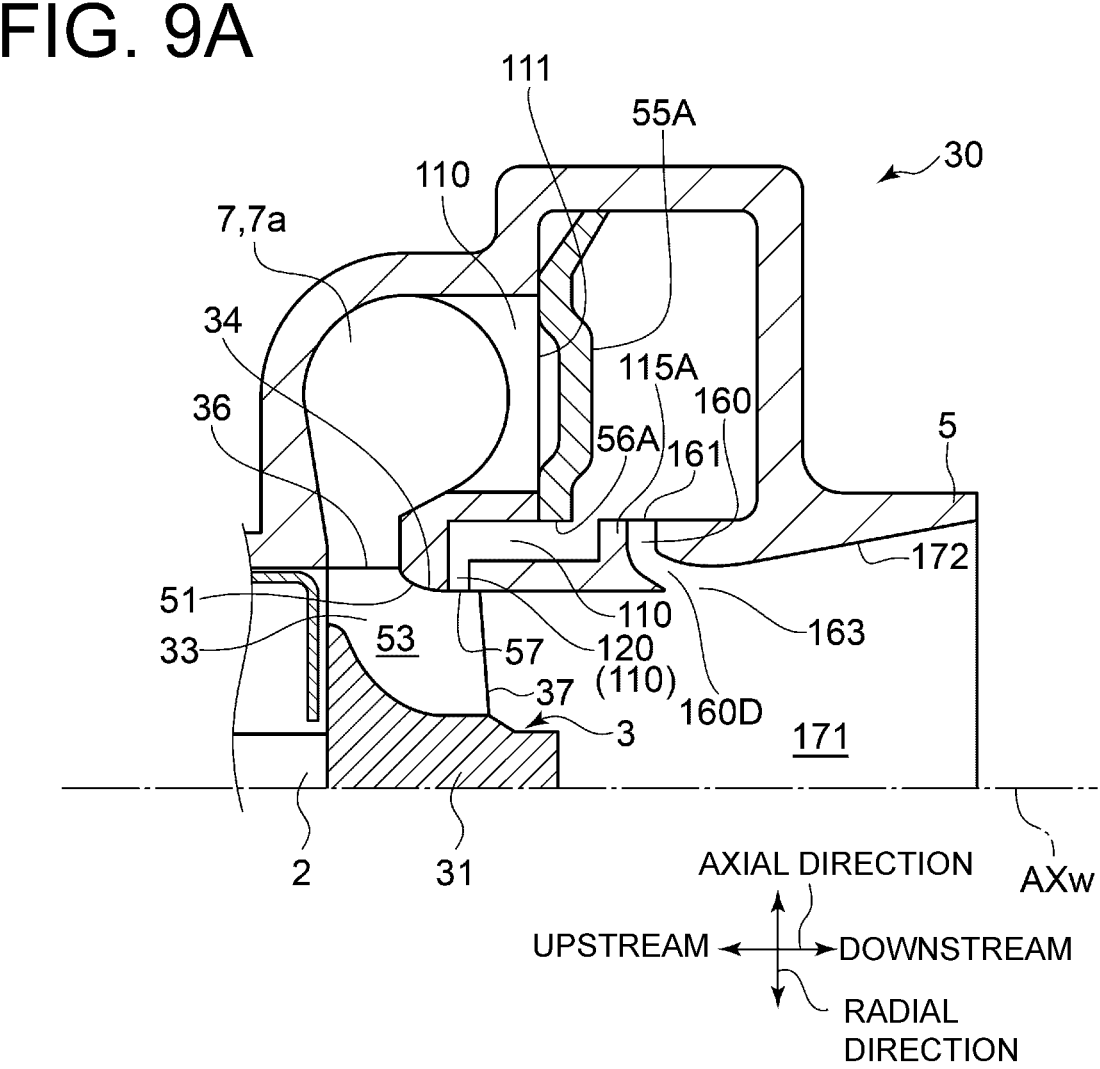
FIG. 9A is a view schematically showing a cross-section of a part of a turbine according to still another embodiment.
Figure 9B:
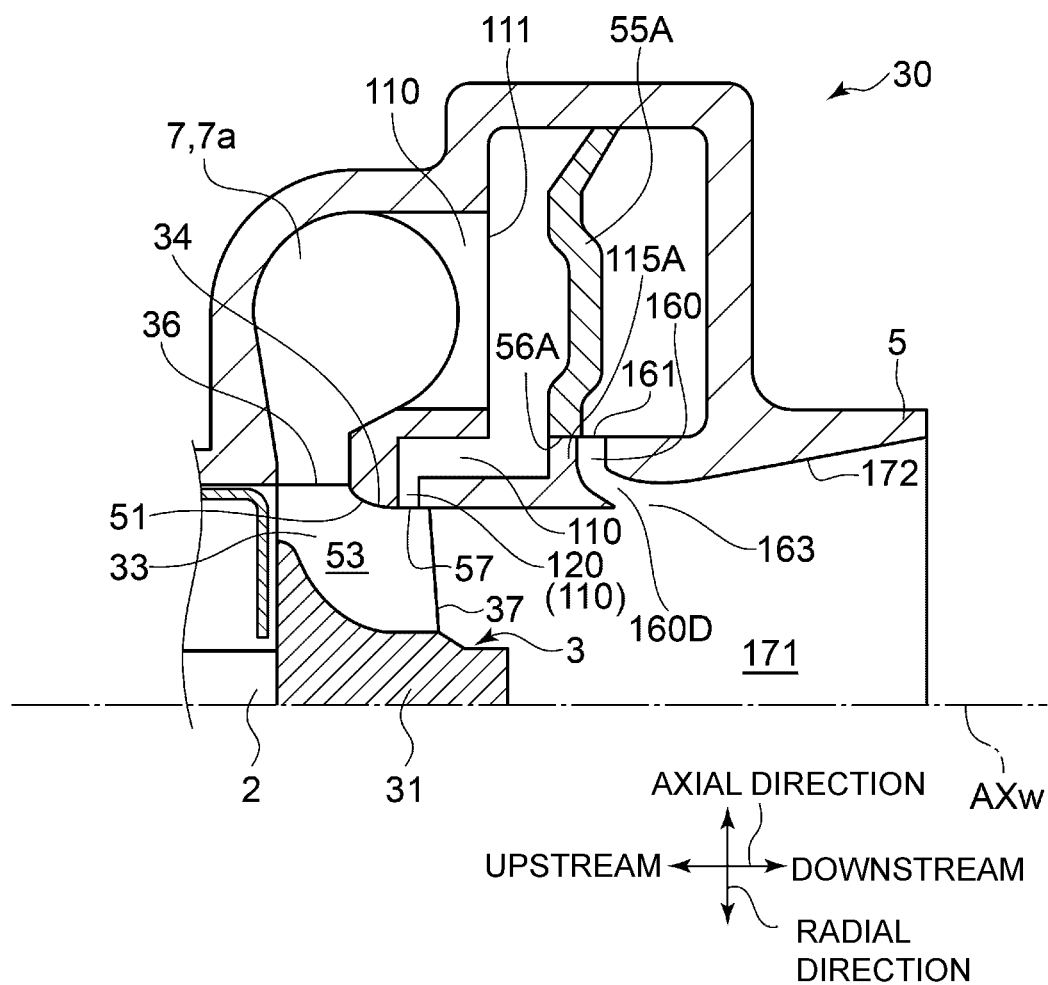
FIG. 9B is a view schematically showing a cross-section of a part of a turbine according to still another embodiment.
Figure 9C:
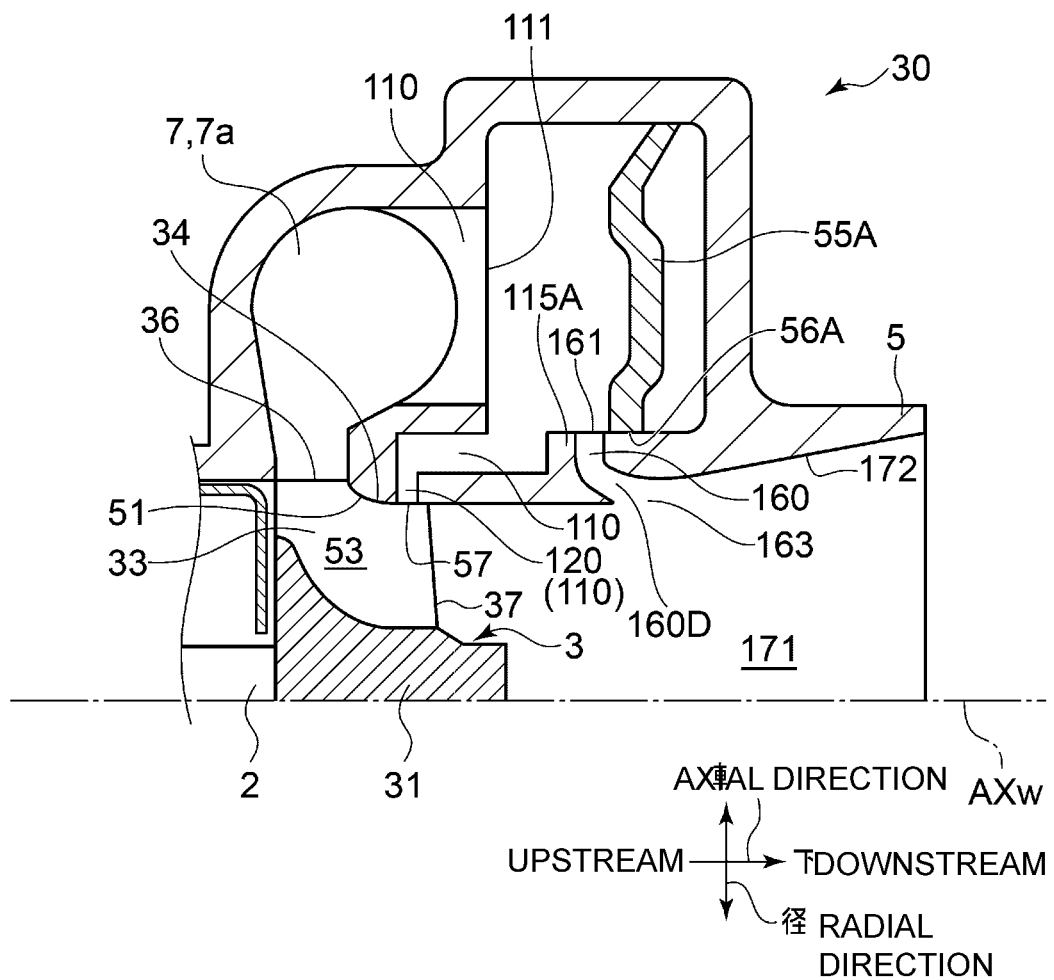
FIG. 9C is a view schematically showing a cross-section of a part of a turbine according to still another embodiment.

FIGS. 8A to 8C are each a view schematically showing a cross-section of a part of the turbine 30 according to still another embodiment.

FIG. 8A shows a state where the wastegate valve 55 closes the opening 111.

FIG. 8B shows a case where the opening degree of the wastegate valve 55 is relatively small.

FIG. 8C shows a case where the opening degree of the wastegate valve 55 is relatively large.

FIGS. 9A to 9C are each a view schematically showing a cross-section of a part of the turbine 30 according to still another embodiment.

FIG. 9A shows a state where the wastegate valve 55A closes the opening 111.

FIG. 9B shows a case where the opening degree of the wastegate valve 55A is relatively small.

FIG. 9C shows a case where the opening degree of the wastegate valve 55A is relatively large.

As shown in FIGS. 7, 8A to 8C, and 9A to 9C, the turbine 30 according to some embodiments may further include a bypass portion 160 configured to connect the wastegate passage 110 and an exhaust passage 171 formed downstream of the turbine wheel 3.

Thereby, it is possible to increase the flow rate of exhaust gas flowing through the wastegate passage 110. Further, even if the amount of exhaust gas supplied exceeds the amount of exhaust gas required to drive the compressor 40, the excess exhaust gas can be bypassed out of the turbine 30. Consequently, it is possible to improve the output of the turbine 30 when exhaust gas is bypassed to the wastegate passage 110, and it is possible to suppress excessive rotation of the turbine 30 to improve the reliability of the turbine 30.

More specifically, in the turbine 30 shown in FIG. 7, an upstream end 161 of the bypass portion 160 is connected to a region of the wastegate passage 110 downstream of the opening 111. A downstream end 163 of the bypass portion 160 is connected to the exhaust passage 171 formed downstream of the trailing edges 37 of the blades 33 of the turbine wheel 3. In the turbine 30 shown in FIG. 7, when the wastegate valve 55 opens the opening 111, the exhaust gas from the opening 111 flows into the communication portion 120 and the bypass portion 160.

In the turbine 30 shown in FIG. 7, the exhaust gas flowing into the communication portion 120 as described above flows from the communication portion 120 into the turbine wheel accommodating space 53 and flows toward the plurality of blades 33 of the turbine wheel 3.

In the turbine 30 shown in FIG. 7, the exhaust gas flowing into the bypass portion 160 does not flow from the bypass portion 160 into the turbine wheel accommodating space 53 but directly flows into the exhaust passage 171.

As shown in FIGS. 7, 8A to 8C, and 9A to 9C, in the turbine 30 according to some embodiments, the communication portion 120 through which the wastegate passage 110 is communicated with the turbine wheel accommodating space 53 may be located upstream of the opening 111 in the axial direction. The bypass portion 160 may be located downstream of the opening 111 in the axial direction.

For example, if the opening degree of the wastegate valve 55, 55A is relatively small and the axial position of the gap between the wastegate valve 55, 55A and the opening 111 is located upstream of the upstream end 161 of the bypass portion 160 along the axial direction, the flow of exhaust gas from the opening 111 toward the bypass portion 160 is blocked by the wastegate valve 55, 55A. Therefore, the exhaust gas from the opening 111 flows toward the communication portion 120. In other words, if the opening degree of the wastegate valve 55, 55A is relatively small, the exhaust gas from the opening 111 mainly flows to the communication portion 120.

If the opening degree of the wastegate valve 55, 55A is relatively large, the flow of exhaust gas from the opening 111 toward the bypass portion 160 is less likely to be blocked by the wastegate valve 55, 55A, so that the exhaust gas easily flows toward the bypass portion 160. In other words, if the opening degree of the wastegate valve 55, 55A is relatively large and, for example as shown in FIGS. 7, 8A to 8C, and 9A to 9C, the upstream end 161 of the bypass portion 160 is located within the range of the axial position of the gap between the wastegate valve 55, 55A and the opening 111, the exhaust gas from the opening 111 flows not only to the communication portion 120 but also to the bypass portion 160.

Thus, the distribution ratio of exhaust gas flowing to the communication portion 120 and the bypass portion 160 can be adjusted by the opening degree of the wastegate valve 55, 55A. Consequently, it is possible to improve the output of the turbine 30 more greatly when exhaust gas is bypassed to the wastegate passage 110, and it is possible to suppress excessive rotation of the turbine 30 to improve the reliability of the turbine 30.

As shown in FIGS. 8A to 8C, the wastegate valve 55 pivotably supported may have a distal end portion 56 located farthest from the swing center Cv of the wastegate valve 55. For example, the turbine 30 shown in FIGS. 8A to 8C may have a facing portion 115 facing the distal end portion 56 of the wastegate valve 55 in the wastegate passage 110 with a relatively small gap therebetween. For example, in the turbine 30 shown in FIGS. 8A to 8C, the upstream end 161 of the bypass portion 160 may be located downstream of the facing portion 115 in the axial direction.

In the turbine 30 shown in FIGS. 8A to 8C, when the wastegate valve 55 closes the opening 111 as shown in FIG. 8A, exhaust gas does not flow to the wastegate passage 110 downstream of the opening 111.

In the turbine 30 shown in FIGS. 8A to 8C, consider the case where the opening degree of the wastegate valve 55 is relatively small as shown in FIG. 8B, and at least a part of the distal end portion 56 of the wastegate valve 55 and the facing portion 115 overlap along the axial direction, that is, at least a part of the distal end portion 56 is located upstream of the upstream end 161 of the bypass portion 160 in the axial direction. In this case, since at least a part of the distal end portion 56 of the wastegate valve 55 overlaps the facing portion 115 along the axial direction, exhaust gas can hardly flow through the gap between the distal end portion 56 of the wastegate valve 55 and the facing portion 115. Therefore, the exhaust gas from the opening 111 flows into the communication portion 120 except for a small amount that flows through the gap.

In the turbine 30 shown in FIGS. 8A to 8C, consider the case where the opening degree of the wastegate valve 55 is relatively large as shown in FIG. 8C, and the distal end portion 56 of the wastegate valve 55 is located downstream of the facing portion 115 along the axial direction, that is, at least a part of the upstream end 161 of the bypass portion 160 is located upstream of the distal end portion 56 of the wastegate valve 55 in the axial direction. In this case, the exhaust gas from the opening 111 flows into the communication portion 120 and the bypass portion 160.

Further, for example, as shown in FIGS. 9A to 9C, the wastegate valve 55A may be configured to be movable in the axial direction without changing the posture relative to the turbine housing 5 instead of being pivotable, and may be configured to close or open the opening 111 by moving in the axial direction. The wastegate valve 55A shown in FIGS. 9A to 9C may have a distal end portion 56A located at the radially inner side of the wastegate valve 55A. For example, the turbine 30 shown in FIGS. 9A to 9C may have a facing portion 115A facing the distal end portion 56A of the wastegate valve 55A in the wastegate passage 110 with a relatively small gap therebetween. For example, in the turbine 30 shown in FIGS. 9A to 9C, the upstream end 161 of the bypass portion 160 may be located downstream of the facing portion 115A in the axial direction.

In the turbine 30 shown in FIGS. 9A to 9C, when the wastegate valve 55A closes the opening 111 as shown in FIG. 9A, exhaust gas does not flow to the wastegate passage 110 downstream of the opening 111.

In the turbine 30 shown in FIGS. 9A to 9C, consider the case where the opening degree of the wastegate valve 55A is relatively small as shown in FIG. 9B, and at least a part of the distal end portion 56A of the wastegate valve 55A and the facing portion 115A overlap along the axial direction, that is, at least a part of the distal end portion 56A is located upstream of the upstream end 161 of the bypass portion 160 in the axial direction. In this case, since at least a part of the distal end portion 56A of the wastegate valve 55A overlaps the facing portion 115 along the axial direction, exhaust gas can hardly flow through the gap between the distal end portion 56A of the wastegate valve 55A and the facing portion 115A. Therefore, the exhaust gas from the opening 111 flows into the communication portion 120 except for a small amount that flows through the gap.

In the turbine 30 shown in FIGS. 9A to 9C, consider the case where the opening degree of the wastegate valve 55A is relatively large as shown in FIG. 9C, and the distal end portion 56A of the wastegate valve 55A is located downstream of the facing portion 115A along the axial direction, that is, at least a part of the upstream end 161 of the bypass portion 160 is located upstream of the distal end portion 56A of the wastegate valve 55A in the axial direction. In this case, the exhaust gas from the opening 111 flows into the communication portion 120 and the bypass portion 160.

As shown in FIGS. 8A to 8C and 9A to 9C, a downstream region 160D of the bypass portion 160 may be oblique downstream in the axial direction so that exhaust gas discharged from the bypass portion 160 flows downstream in the axial direction along a passage wall surface 172 that forms the exhaust passage 171.

As described above, generally, when the wastegate valve 55A is open to allow exhaust gas to flow through the wastegate passage 110, the pressure ratio of the turbine 30 tends to be high. Therefore, the flow velocity of exhaust gas flowing through the bypass portion 160 is relatively high. Therefore, when the bypass portion 160 is configured such that the exhaust gas discharged from the bypass portion 160 flows downstream in the axial direction along the passage wall surface 172, the exhaust gas discharged from the bypass portion 160 imparts momentum to a boundary layer of a turbine diffuser (not shown) connected to the downstream side of the exhaust passage 171. Thus, it is possible to suppress the separation of the flow on the turbine diffuser.

The present disclosure is not limited to the embodiments described above, but includes modifications to the embodiments described above, and embodiments composed of combinations of those embodiments.

The contents described in the above embodiments would be understood as follows, for instance.

(1) A turbine 30 according to at least one embodiment of the present disclosure is provided with: a turbine wheel 3 having a plurality of blades 33; a turbine housing 5 internally forming a turbine wheel accommodating space 53 for accommodating the turbine wheel 3; and a wastegate valve 55, 55A for controlling a flow rate of exhaust gas flowing through a wastegate passage 110 formed inside the turbine housing 5. The wastegate passage 110 is configured to connect a scroll passage 7a formed inside the turbine housing 5 and a region upstream of the trailing edge 37 of each of the plurality of blades 33 in the turbine wheel accommodating space 53.

With the above configuration (1), the wastegate passage 110 is configured such that exhaust gas flowing through the wastegate passage 110 is guided to a region upstream of the trailing edge 37 of each of the blades 33 in the turbine wheel accommodating space 53. Thereby, the exhaust gas in the wastegate passage 110 flows toward the plurality of blades 33 of the turbine wheel 3, so that energy of the exhaust gas can be recovered as kinetic energy of the turbine wheel 3. As a result, power can be recovered from the exhaust gas flowing through the wastegate passage 110, and the output of the turbine 30 can be improved when the exhaust gas is bypassed to the wastegate passage 110. Further, by guiding the exhaust gas flowing through the wastegate passage 110 to the turbine wheel accommodating space 53, tip leakage of the exhaust gas through the gap between the tips 34 of the plurality of blades 33 and the turbine housing 5 can be suppressed. Thereby, the efficiency of the turbine 30 can be improved, and thus the output of the turbine 30 can be improved.

(2) In some embodiments, in the above configuration (1), the wastegate passage 110 may be configured to connect the scroll passage 7a and a region downstream of the throat portion 35 and upstream of the trailing edge 37 of each of the plurality of blades 33 in the turbine wheel accommodating space 53.

As described above, generally, the turbine intake flow amount is determined by the flow passage area of the throat portion. Therefore, if the wastegate passage 110 is connected to a region upstream of the throat portion 35, the intake flow amount of the turbine 30 may be reduced due to exhaust gas that flows into the region upstream of the throat portion 35 via the wastegate passage 110.

Therefore, as in the above configuration (2), by connecting the wastegate passage 110 to a region downstream of the throat portion 35, even if the exhaust gas having flowed through the wastegate passage 110 flows into the turbine wheel accommodating space 53, the influence on the intake flow amount of the turbine 30 can be suppressed. Further, by connecting the wastegate passage 110 to a region downstream of the throat portion 35, compared to the case where the wastegate passage 110 is connected to a region upstream of the throat portion 35, the exhaust gas can be efficiently discharged to the downstream side of the turbine 30 via the wastegate passage 110.

(3) In some embodiments, in the above configuration (1) or (2), the turbine wheel 3 may further include a plurality of splitter blades 133 arranged between the plurality of blades 33 and formed such that the trailing edge 137 of each of the plurality of splitter blades 133 is located on the leading edge 36 side compared to the trailing edge 37 of each of the plurality of blades 33. The wastegate passage 110 may be configured to connect the scroll passage 7a and a region downstream of the trailing edge 137 of each of the splitter blades 133 and upstream of the trailing edge 37 of each of the plurality of blades 33 in the turbine wheel accommodating space 53.

If the throat portion 35 exists within the existence region of the splitter blade 133 in the flow passage formed between two circumferentially adjacent blades 33, by adopting the above configuration (3), the wastegate passage 110 is connected to a region downstream of the throat portion 35. Thus, even if the exhaust gas having flowed through the wastegate passage 110 flows into the turbine wheel accommodating space 53, the influence on the intake flow amount of the turbine can be suppressed. Further, by connecting the wastegate passage 110 to a region downstream of the trailing edge 137 of the splitter blade 133, compared to the case where the wastegate passage 110 is connected to a region upstream of the trailing edge 137 of the splitter blade 133, the exhaust gas can be efficiently discharged to the downstream side of the turbine 30 via the wastegate passage 110. Further, since the turbine wheel 3 has the plurality of splitter blades 133, the performance of the turbine 30 can be improved even when exhaust gas does not flow through the wastegate passage 110.

(4) In some embodiments, in any one of the above configurations (1) to (3), a communication portion 120 through which the wastegate passage 110 is communicated with the turbine wheel accommodating space 53 may include a plurality of communication holes 121, 122 arranged at intervals in the circumferential direction.

With the above configuration (4), the exhaust gas in the wastegate passage 110 can flow through the plurality of communication holes 121, 122 toward the plurality of blades 33 of the turbine wheel 3, ensuring the velocity of exhaust gas blown out of the plurality of communication holes 121, 122.

(5) In some embodiments, in any one of the above configurations (1) to (3), a communication portion 120 through which the wastegate passage 110 is communicated with the turbine wheel accommodating space 53 may include a groove 125 extending along the circumferential direction.

With the above configuration (5), the exhaust gas in the wastegate passage 110 can flow through the groove 125 extending in the circumferential direction toward the plurality of blades 33 of the turbine wheel 3, suppressing oscillation of the blades 33 and improving the reliability of the turbine 30.

(6) In some embodiments, in the above configuration (5), the wastegate passage 110 may include a scroll portion 150 configured to have a cross-sectional area that decreases downstream in the rotational direction R of the turbine wheel 3 and communicating with the turbine wheel accommodating space 53 through the groove 125.

With the above configuration (6), the scroll portion 150 guides the exhaust gas along the circumferential direction, suppressing the difference in flow rate of exhaust gas flowing into the turbine wheel accommodating space 53 through the groove 125 depending on the circumferential position. As a result, it is possible to improve the output of the turbine 30 more greatly when exhaust gas is bypassed to the wastegate passage 110.

(7) In some embodiments, in the above configuration (5) or (6), the turbine may be further provided with a plurality of nozzle members 131, 132 arranged in the groove 125 at intervals in the circumferential direction and configured to guide exhaust gas passing inside the groove 125 so as to flow downstream in the rotational direction R of the turbine wheel 3 as the exhaust gas moves inward in the radial direction.

With the above configuration (7), the plurality of nozzle members 131, 132 guides the exhaust gas as described above, so that the exhaust gas can efficiently flow into the turbine wheel accommodating space 53. As a result, it is possible to improve the output of the turbine more greatly when exhaust gas is bypassed to the wastegate passage 110.

(8) In some embodiments, in any one of the above configurations (4) to (7), the communication portion 120 may have a convergent-divergent shape.

Generally, when the wastegate valve 55, 55A is open to allow exhaust gas to flow through the wastegate passage 110, the pressure ratio of the turbine 30 tends to be high. Therefore, the flow velocity of exhaust gas flowing through the communication portion 120 is very high. Therefore, with the above configuration (8), since the communication portion 120 has a convergent-divergent shape, or de Laval nozzle shape, energy of exhaust gas blown out of the communication portion 120 can be efficiently converted into kinetic energy of the turbine wheel 3. As a result, it is possible to improve the output of the turbine 30 more greatly when exhaust gas is bypassed to the wastegate passage 110. Further, since it is relatively easy to machine the communication portion 120 into a convergent-divergent shape, the manufacturing cost can be reduced.

(9) In some embodiments, in any one of the above configurations (1) to (8), the turbine may further include a bypass portion 160 configured to connect the wastegate passage 110 and an exhaust passage 171 formed downstream of the turbine wheel 3.

With the above configuration (9), it is possible to increase the flow rate of exhaust gas flowing through the wastegate passage 110. Further, even if the amount of exhaust gas supplied exceeds the amount of exhaust gas required to drive the compressor 40, the excess exhaust gas can be bypassed out of the turbine 30. Consequently, it is possible to improve the output of the turbine 30 when exhaust gas is bypassed to the wastegate passage 110, and it is possible to suppress excessive rotation of the turbine 30 to improve the reliability of the turbine 30.

(10) In some embodiments, in the above configuration (9), the wastegate passage 110 may include an opening 111 opened and closed by the wastegate valve 55. The wastegate valve 55 may comprise a swing valve whose radially outer position is pivotably supported by the turbine housing 5. The communication portion 120 through which the wastegate passage 110 is communicated with the turbine wheel accommodating space 53 may be located upstream of the opening 111 in the axial direction. The bypass portion 160 may be located downstream of the opening 111 in the axial direction.

With the above configuration (10), if the opening degree of the wastegate valve 55 is relatively small, the flow of exhaust gas from the opening 111 toward the bypass portion 160 is blocked by the wastegate valve 55, so that the exhaust gas flows toward the communication portion 120. Therefore, if the opening degree of the wastegate valve 55 is relatively small, the exhaust gas from the opening 111 mainly flows to the communication portion 120.

If the opening degree of the wastegate valve 55 is relatively large, the flow of exhaust gas from the opening 111 toward the bypass portion 160 is less likely to be blocked by the wastegate valve 55, so that the exhaust gas easily flows toward the bypass portion 160. Therefore, if the opening degree of the wastegate valve 55 is relatively large, the exhaust gas from the opening 111 flows not only to the communication portion 120 but also to the bypass portion 160.

Thus, the distribution ratio of exhaust gas flowing to the communication portion 120 and the bypass portion 160 can be adjusted by the opening degree of the wastegate valve 55. Consequently, it is possible to improve the output of the turbine 30 more greatly when exhaust gas is bypassed to the wastegate passage 110, and it is possible to suppress excessive rotation of the turbine to improve the reliability of the turbine 30.

(11) In some embodiments, in the above configuration (9), the wastegate passage 110 may include an opening 111 opened and closed by the wastegate valve 55A. The wastegate valve 55A may be configured to be movable in the axial direction. The communication portion 120 through which the wastegate passage 110 is communicated with the turbine wheel accommodating space 53 may be located upstream of the opening 111 in the axial direction. The bypass portion 160 may be located downstream of the opening 111 in the axial direction.

With the above configuration (11), if the opening degree of the wastegate valve 55A is relatively small, the flow of exhaust gas from the opening 111 toward the bypass portion 160 is blocked by the wastegate valve 55A, so that the exhaust gas flows toward the communication portion 120. Therefore, if the opening degree of the wastegate valve 55A is relatively small, the exhaust gas from the opening 111 mainly flows to the communication portion 120.

If the opening degree of the wastegate valve 55A is relatively large, the flow of exhaust gas from the opening 111 toward the bypass portion 160 is less likely to be blocked by the wastegate valve 55A, so that the exhaust gas easily flows toward the bypass portion 160. Therefore, if the opening degree of the wastegate valve 55A is relatively large, the exhaust gas from the opening 111 flows not only to the communication portion 120 but also to the bypass portion 160.

Thus, the distribution ratio of exhaust gas flowing to the communication portion 120 and the bypass portion 160 can be adjusted by the opening degree of the wastegate valve 55A. Consequently, it is possible to improve the output of the turbine 30 more greatly when exhaust gas is bypassed to the wastegate passage 110, and it is possible to suppress excessive rotation of the turbine to improve the reliability of the turbine 30.

(12) A turbocharger 1 according to at least one embodiment of the present disclosure is provided with the turbine 30 according to any one of the above configurations (1) to (11).

With the above configuration (12), it is possible to provide the turbocharger 1 with improved partial load performance of the turbine 30.

REFERENCE SIGNS LIST

1 Turbocharger
3 Turbine wheel
5 Casing (Turbine housing)
7 Scroll portion
7a Scroll passage
30 Turbine
33 Blade (Rotor blade)
34 Tip portion (Tip)
35 Throat portion
36 Leading edge
37 Trailing edge
53 Turbine wheel accommodating space
55, 55A Wastegate valve
110 Wastegate passage
111 Opening
120 Communication portion
121, 122 Communication hole
125 Groove
131, 132 Nozzle member
133 Splitter blade
137 Trailing edge
140 Nozzle portion
160 Bypass portion
171 Exhaust passage

The invention claimed is:

1. A turbine, comprising:
a turbine wheel having a plurality of blades;
a single scroll type turbine housing internally forming a turbine wheel accommodating space for accommodating the turbine wheel; and
a wastegate valve for controlling a flow rate of exhaust gas flowing through a wastegate passage formed inside the single scroll type turbine housing,
wherein the wastegate passage is configured to connect a scroll passage formed inside the single scroll type turbine housing and a region upstream of a trailing edge of each of the plurality of blades in the turbine wheel accommodating space.

2. The turbine according to claim 1,
wherein the wastegate passage is configured to connect the scroll passage and a region downstream of a throat portion and upstream of the trailing edge of each of the plurality of blades in the turbine wheel accommodating space.

3. The turbine according to claim 1,
wherein the turbine wheel further includes a plurality of splitter blades arranged between the plurality of blades and formed such that a trailing edge of each of the plurality of splitter blades is located on a leading edge side compared to the trailing edge of each of the plurality of blades, and
wherein the wastegate passage is configured to connect the scroll passage and a region downstream of the trailing edge of each of the plurality of splitter blades and upstream of the trailing edge of each of the plurality of blades in the turbine wheel accommodating space.

4. The turbine according to claim 1,
wherein a communication portion through which the wastegate passage is communicated with the turbine wheel accommodating space includes a plurality of communication holes arranged at intervals in a circumferential direction.

5. The turbine according to claim 1,
wherein a communication portion through which the wastegate passage is communicated with the turbine wheel accommodating space includes a groove extending along a circumferential direction.

6. The turbine according to claim 5,
wherein the wastegate passage includes a scroll portion configured to have a cross-sectional area that decreases downstream in a rotational direction of the turbine wheel and communicating with the turbine wheel accommodating space through the groove.

7. The turbine according to claim 5, further comprising a plurality of nozzle members arranged in the groove at intervals in a circumferential direction and configured to guide exhaust gas passing inside the groove so as to flow downstream in a rotational direction of the turbine wheel as the exhaust gas moves inward in a radial direction.

8. The turbine according to claim 4,
wherein the communication portion has a convergent-divergent shape.

9. The turbine according to claim 1, further comprising a bypass portion configured to connect the wastegate passage and an exhaust passage formed downstream of the turbine wheel.

10. The turbine according to claim 9,
wherein the wastegate passage includes an opening opened and closed by the wastegate valve,
wherein the wastegate valve comprises a swing valve whose radially outer position is pivotably supported by the single scroll type turbine housing,
wherein a communication portion through which the wastegate passage is communicated with the turbine wheel accommodating space is located upstream of the opening in an axial direction, and
wherein the bypass portion is located downstream of the opening in the axial direction.

11. The turbine according to claim 9,
wherein the wastegate passage includes an opening opened and closed by the wastegate valve,
wherein the wastegate valve is configured to be movable in an axial direction,
wherein a communication portion through which the wastegate passage is communicated with the turbine wheel accommodating space is located upstream of the opening in the axial direction, and
wherein the bypass portion is located downstream of the opening in the axial direction.

12. A turbocharger, comprising the turbine according to claim 1.

* * * * *